United States Patent
Shams (10) Patent No.: US 7,971,782 B1
(45) Date of Patent: Jul. 5, 2011

(54) MULTI-POINT TRANSACTION SYSTEM

(75) Inventor: Khawaja Shams, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/719,814

(22) Filed: Mar. 8, 2010

(51) Int. Cl.
*G06F 17/60* (2006.01)

(52) U.S. Cl. ........ 235/379; 235/380; 235/382; 235/383; 705/15; 705/16; 705/75

(58) Field of Classification Search .................. 235/379, 235/380, 382, 383; 705/15, 16, 75
See application file for complete search history.

(56) References Cited

U.S. PATENT DOCUMENTS

| | | | |
|---|---|---|---|
| 6,138,914 | A | 10/2000 | Campo et al. |
| 6,687,346 | B1 | 2/2004 | Serbin et al. |
| 6,854,656 | B2 | 2/2005 | Matsumori |
| 6,974,078 | B1 | 12/2005 | Simon |
| 6,975,856 | B2 | 12/2005 | Ogasawara |
| 7,055,737 | B1 | 6/2006 | Tobin et al. |
| 7,363,054 | B2 | 4/2008 | Elias et al. |
| 7,505,785 | B2 | 3/2009 | Callaghan et al. |
| 7,556,203 | B2 | 7/2009 | Robinson et al. |
| 7,575,168 | B2 | 8/2009 | Suomela et al. |
| 2002/0170964 | A1 | 11/2002 | Sabella |
| 2003/0213844 | A1* | 11/2003 | Yoshida et al. ............... 235/383 |
| 2004/0104268 | A1 | 6/2004 | Bailey |
| 2007/0055635 | A1* | 3/2007 | Kanapur et al. ............... 705/75 |
| 2008/0114699 | A1* | 5/2008 | Yuan et al. ............... 705/78 |
| 2008/0319836 | A1* | 12/2008 | Aaltonen et al. ............... 705/10 |
| 2009/0006196 | A1 | 1/2009 | Barkan et al. |
| 2009/0037284 | A1* | 2/2009 | Lewis et al. ............... 705/16 |
| 2009/0222459 | A1 | 9/2009 | Steinberg |
| 2009/0299506 | A1 | 12/2009 | Lydon et al. |
| 2010/0146155 | A1* | 6/2010 | Brock ............................. 710/11 |
| 2010/0235525 | A1* | 9/2010 | McGuire et al. ............... 709/228 |

FOREIGN PATENT DOCUMENTS

| | | |
|---|---|---|
| EP | 0 945 818 B1 | 9/2008 |
| WO | WO 01/061973 A1 | 8/2001 |
| WO | WO 2007/113610 A1 | 10/2007 |

OTHER PUBLICATIONS

John Burke, "Credit card terminals for iPhone," TUAW The Unofficial Apple Weblog, member of the Weblogs, Inc. Network, Sep. 23, 2009 (Available online at http://www.tuaw.com/2009/09/23/credit-card-terminals-for-iphone/, last visited Dec. 17, 2009).

NeoReader Enterprise and Lavashpere Enterprise Product Brochure, "2D barcode scanning technology tailored to optimize business performance," NeoMedia Technologies, Inc. Atlanta, GA, 2009 (Available online at http://neom.com/readerenterprise-specs.php, last visited Jan. 4, 2010).

Gary Allen, "Exclusive look at Apple's new iPod touch-based EasyPay checkout," AppleInsider, www.appleinsider.com, Nov. 3, 2009 (Available online at http://www.appleinsider.com/articles/09/11/03/exclusive_look_at_apples_new_ipod_touch_based_easypay_checkout.html, last visited Dec. 16, 2010).

* cited by examiner

*Primary Examiner* — Allyson N Trail
(74) *Attorney, Agent, or Firm* — Brian McKnight; Novak Druce + Quigg LLP (57) ABSTRACT

Computer implemented systems and methods for conducting transactions are disclosed. In one exemplary embodiment, a method includes receiving transaction information corresponding to a transaction initiated with one of a plurality of handheld computing devices. The handheld computing device is associated with one of a plurality of payment terminals. The transaction is completed and the association between the handheld computing device and the payment terminal is terminated.

19 Claims, 6 Drawing Sheets

MULTI-POINT TRANSACTION SYSTEM

TECHNICAL FIELD

The following relates to temporarily pairing devices to complete transactions; and more specifically to temporarily pairing at least one handheld communication device selected from a plurality of handheld communication devices with at least one payment terminal selected from a plurality of payment terminals.

BACKGROUND

In the sale of goods from merchants to consumers, point-of-sale systems are used to complete transactions. The shopping experience of a consumer can be heavily influenced by the method in which a transaction is consummated at the point-of-sale. One drawback of conventional point-of-sale systems is that they are in a fixed location. Such systems require a potential purchaser to select an item for purchase and then find a point-of-sale. Along the way purchasing decisions can change and a sale can be lost. Additionally, long lines can also cause a potential customer to walk away from a purchase.

Among other reasons why point-of-sale systems are traditionally stationary is that some financial transactions can only be carried out using specialized payment terminal devices, such as a HYPERCOM payment terminal, produced by Hypercom Corporation, Phoenix, Ariz. For example, these payment terminals are the only devices certified to carry out financial transactions requiring a user to enter a personal identification number (PIN). These payment terminals for implementing such payment methods are specifically designed to comply with strict banking and security protocols. Each country or state may require variations in security and architectural design for certifying authorized payment terminals. Therefore, payment terminals are often independent designed devices that are not designed for integration with other non-certified devices.

SUMMARY

The disclosed technology overcomes the drawbacks of the prior art technologies by providing a roaming point-of-sale system that can be paired with a certified payment terminal to complete transactions requiring such payment terminals.

The following disclosure relates to multi-point transaction systems and methods, wherein any roaming point-of-sale system can be paired with any available payment terminal to complete a transaction. Using a roaming point-of-sale system, a sales associate can initiate a sales transaction with a customer at any location within a store. In many cases, such as if the customer pays with a credit card, the sales associate can complete the transaction at the point of contact with the customer. However, if the customer would like to pay with a bankcard, or other payment form that requires entry of a PIN to complete the transaction, the sales associate can bring the customer to a payment terminal to complete the transaction. A plurality of payment terminals are preferably located throughout the store to minimize drawbacks associated with stationary point-of-sale systems.

The present technology initiates a transaction with one of a plurality of roaming point-of-sale systems carried by sales associates within the retail store. Preferably, each sales associate will have their own roaming point-of-sale system. When a payment terminal is required to complete the transaction, a sales associate can pair her roaming point-of-sale system with one a plurality of payment terminals located throughout the retail store for the purpose of completing the sales transaction.

Pairing a roaming point-of-sale system with a payment terminal can require the roaming point-of-sale system to be identified to the payment terminal or vice versa. This can be completed by moderating the transaction with an in-store server. A roaming point-of-sale system can request to be paired with an identified payment terminal. The payment terminal can be identified by a unique name, an Internet protocol address (IP address) of the device on the network, or identifying information embedded into a barcode, as examples.

The roaming point-of-sale system can request a server to broker a pairing between the roaming point-of-sale system and the identified payment terminal. The server can then associate the roaming point-of-sale system with the payment terminal and confirm that the payment terminal is properly identified by sending a pairing code to both devices. The pairing code can be read by the sales associate and entered into the payment terminal, which is now expecting the pairing code at the instruction of the server.

Entering the proper pairing code can complete the pairing process and the roaming point-of-sale system can communicate with the payment terminal via the in-store network to communicate product or transaction information such as an amount to be charged to complete the sale.

The payment terminal can receive a PIN from the customer, which authorizes the transaction. The payment terminal can complete the financial transaction by communicating with a clearinghouse to approve and secure payment for the specified amount.

The payment terminal can report payment confirmation to the roaming point-of-sale system. A record of the entire transaction can be recorded by the in-store server for accounting, and inventory purposes, etc.

Upon completion of the transaction, the paired relationship between the roaming point-of-sale system and the payment terminal is terminated to allow for pairing of either the roaming point-of-sale system or the payment terminal with other devices to complete other transactions.

Accordingly, the present technology provides for methods and systems for temporarily pairing a device selected from a pool of such devices, with another device, selected form a pool of such devices. One potential use for such technology is in the retail store environment.

BRIEF DESCRIPTION OF THE DRAWINGS

Reference will now be made, by way of example, to the accompanying drawings illustrating exemplary embodiments of the present disclosure.

DESCRIPTION

Other aspects of the present disclosure will be apparent to those of ordinary skill in the art from a review of the following detailed description in conjunction with the drawings.

Embodiments of the present application are not limited to any particular operating system, mobile device architecture, server architecture, or computer programming language.

Figure 1:
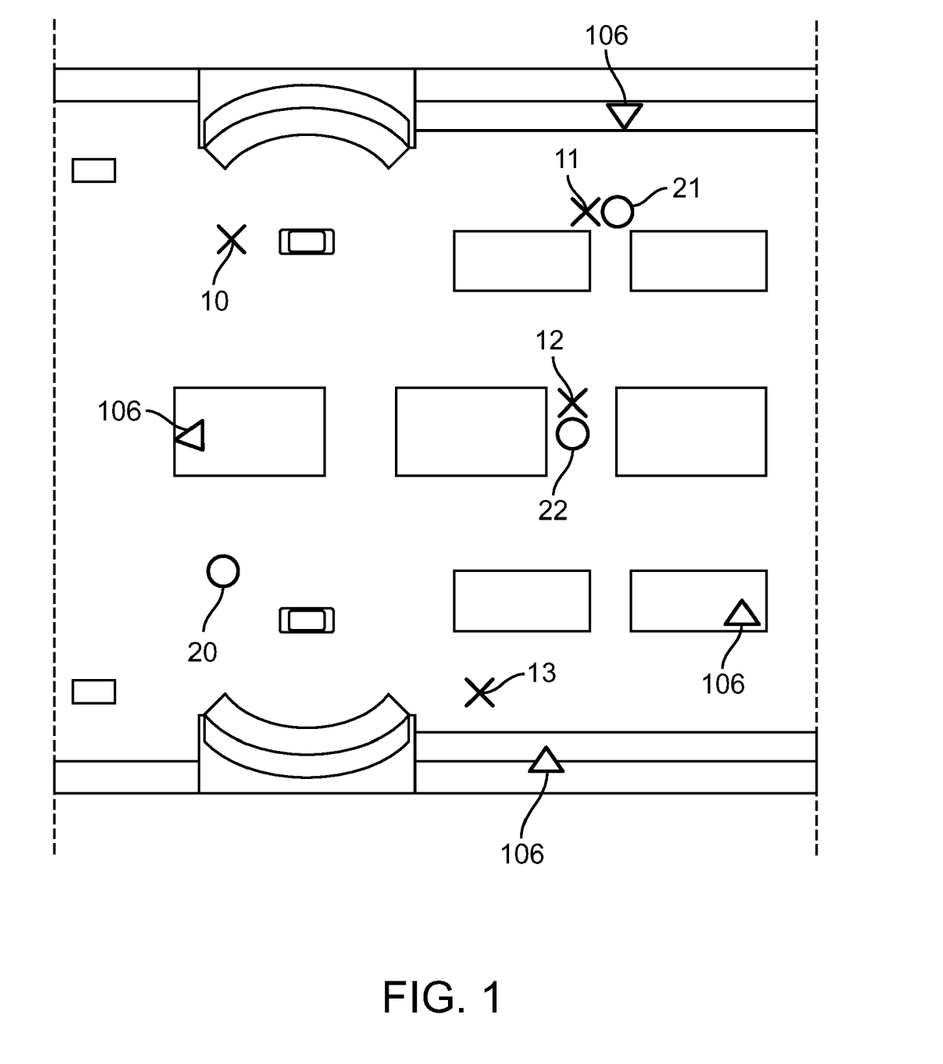
FIG. 1 illustrates an exemplary system in a retail store embodiment.

FIG. 1 illustrates the present technology in an exemplary working environment, a retail store. Customers 10, 11, 12, and 13 are illustrated browsing the store, while sales associates 20, 21, and 22 are located throughout the store. Each sales associate can be equipped with a roaming point-of-sale system. Also illustrated are payment terminals 106.

The present technology is particularly useful in this environment. For example, sales associate 22 can aid customer 12 in purchasing a product by bringing the point-of-sale to the customer using the sales associate's roaming point-of-sale system. If however, the customer wants to pay using a bankcard, requiring the entry of a PIN, the sales associated and customer do not need to find a stationary register, but rather they can complete the transaction on the nearest available payment terminal by temporarily associating the roaming point-of-sale system with the payment terminal to complete the transaction.

Figure 2:
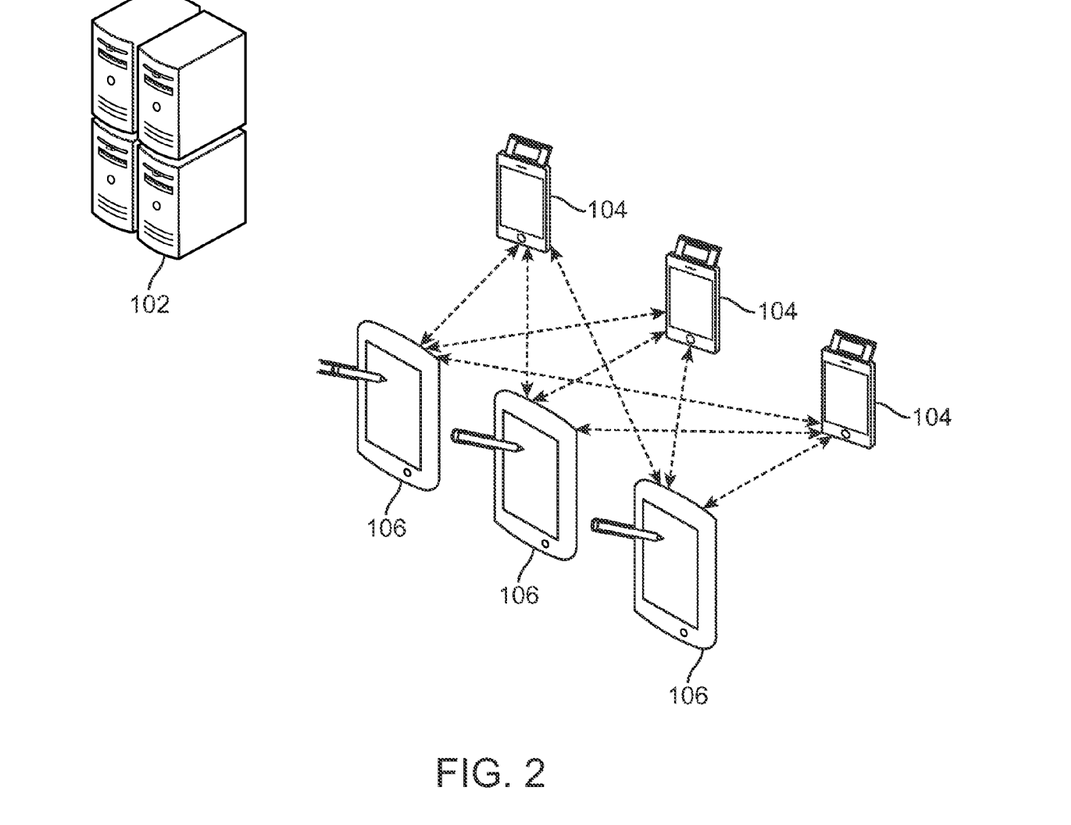
FIG. 2 illustrates an exemplary system allowing pairing of any roaming point-of-sale system with any payment terminal.

FIG. 2 illustrates a system embodiment of the present technology wherein a plurality of roaming point-of-sale systems 104 can be temporarily paired with a plurality of payment terminals 106. The dashed lines drawn between the roaming point-of-sale systems 104 and payment terminals 106 illustrate that any roaming point-of-sale system 104 can be paired with any payment terminal 106. Each of the devices are in networked communication with the in-store server 102. The networked communication can be wired or wireless.

Figure 3:
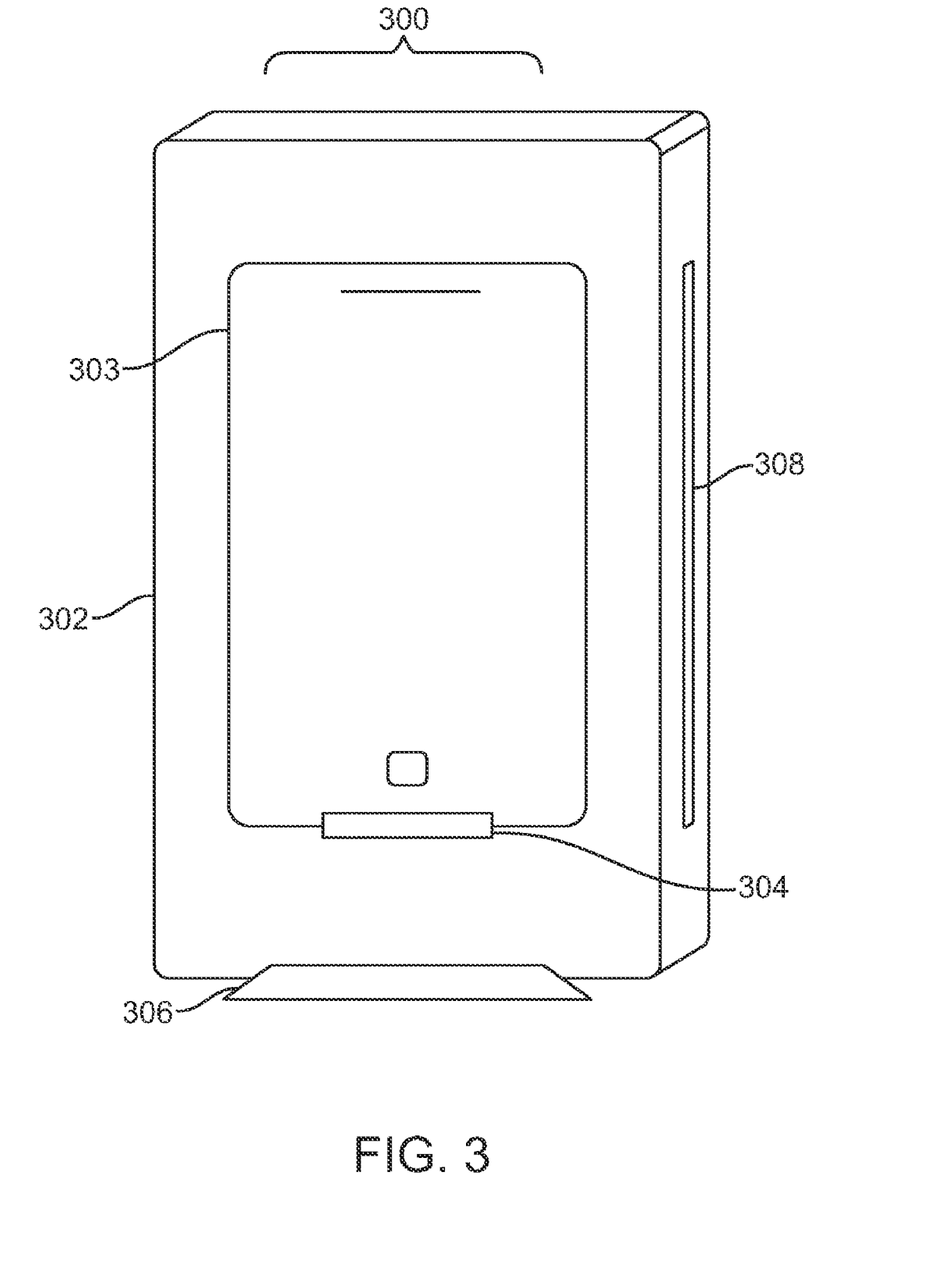
FIG. 3 illustrates an exemplary roaming point-of-sale system.

FIG. 3 illustrates an exemplary roaming point-of-sale system 300, which includes a scanning device 302 and a handheld computing device 303, which can fit into a cavity in the scanning device in a docking arrangement. As illustrated, the handheld computing device can be received in the cavity of the scanning device in such a configuration that gives the appearance that the system is one integral device.

The scanning device 302 includes a barcode scanner 306 and in some embodiments the scanning device can have a magnetic card reader 308, as illustrated. However, in other embodiments, the barcode scanner 306 and the magnetic card reader 308 can be physically distinct devices. As illustrated, the handheld computing device 303 and the scanning device 302 are in electrical communication via connector 304. The connector 304 can be any connection that is able to establish electrical communication between the scanning device 302 and the handheld computing device, but it is especially forseen as being an universal serial bus connector or a 30-pin connector such as is most commonly found on an IPOD TOUCH portable media-playing devices or an IPHONE smartphone, both of which are sold by Apple Inc. of Cupertino, Calif.

Figure 4:
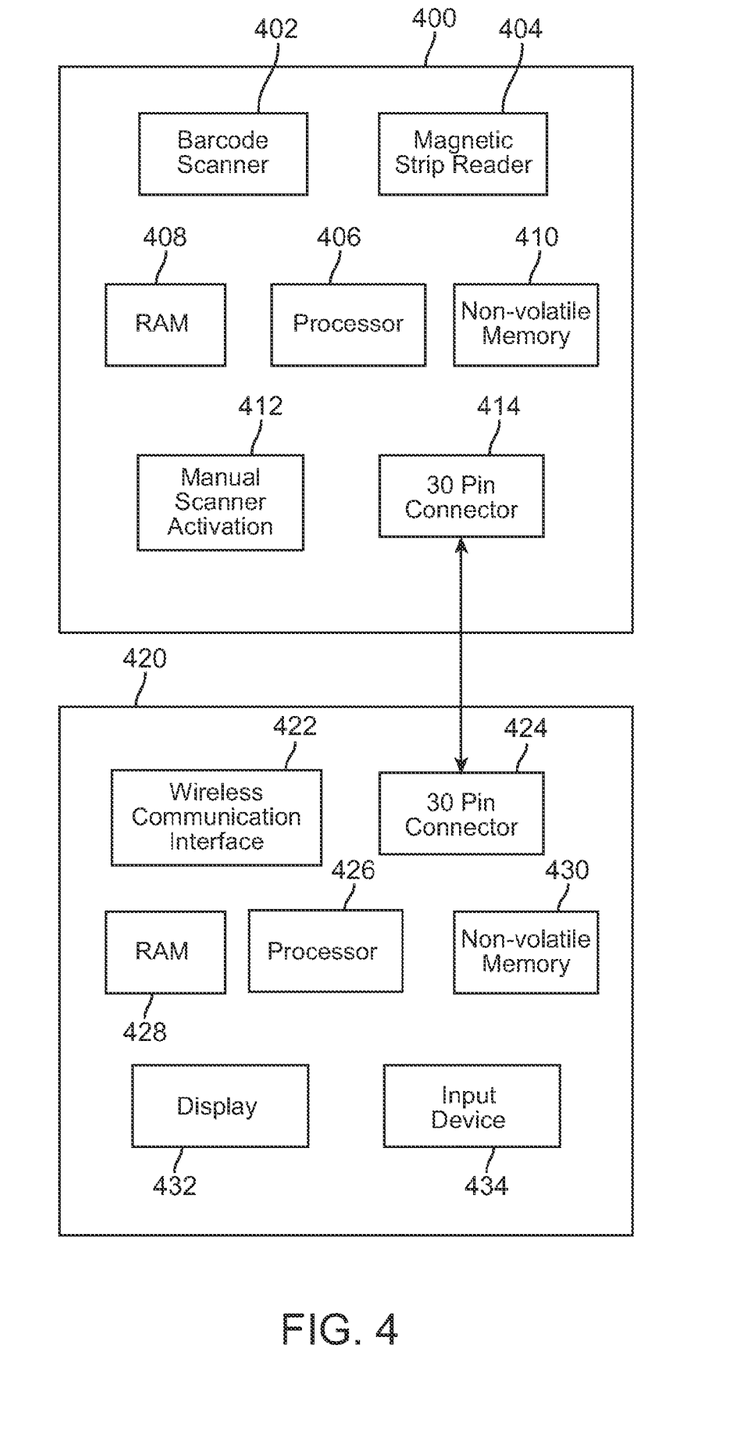
FIG. 4 illustrates a schematic of an exemplary roaming point-of-sale system.

FIG. 4 schematically illustrates a roaming point-of-sale system, which includes a scanning device 400 and a handheld computing device component 420. The handheld computing device includes an input device 434, which is operable to receive an input from a sales associate using the input device 434. The input device can be a keypad and or pointing device, or, as in preferred embodiments, a touch sensitive display. The handheld computing device 420 also includes a processor 426. The handheld computing device processor 426 is configured to load and/or run a point-of-sale application, usually as a result of receiving an input from the input device 434.

The point-of-sale application can be loaded from a storage device 430, which can be any suitable non-volatile memory, into a RAM 428 for use by the handheld computing device processor 426. As directed by the point-of-sale application, the processor 426 sends a barcode-scan command to the scanning device 400 via the 30-pin connectors 414, 424.

The scanning device processor 406 receives the barcode-scan command, which is interpreted in the context of computer-executable instructions (firmware) already loaded in RAM 408. When not in use, the computer-executable instructions (firmware) are stored in non-volatile memory 410.

In response to the barcode-scan command, the barcode scanner 402 scans barcodes and the scanning device processor 406 receives the scanned data and decodes the barcode information and sends the decoded data to the handheld computing device using the connector 414. In some embodiments, the barcode scanner can be manually activated by a manual scanner activation button 412, which also causes the scanning device to scan and decode the barcodes and send the decoded data to the handheld computing device. The data is received by the handheld computing device using its connector 424, which identifies the received code and sends it to RAM 428 for temporary storage in association with the sales application.

The sales application can also instruct the handheld computing device processor 426 to present on the display 432 the progress of the transaction. At this stage, the display can identify the product being purchased based on the scan information and can also prompt the sales associate to enter payment information.

The handheld computing device processor 426 can send a receive-payment instruction over connectors 424 and 414 to the scanner processor 406 in response to either a user-initiated instruction or an instruction given by the sales application. After receiving the receive-payment instruction, the processor 406 can interpret the instruction based on firmware and receive data from a magnetic strip reader 404. The magnetic strip reader 404 is used to accept credit card or bankcard data by reading the magnetic strip that is commonly located on the backs of such cards. The magnetic strip reader 404 passes the received data on to the scanning device processor 406, which sends the data back to the handheld computing device. The processor handheld computing device 426 receives the magnetic strip data and sends the data to RAM 428 for temporary storage in association with the sales program.

The transaction is completed by transmitting payment information to a payment clearinghouse and receiving a payment confirmation therefrom. The handheld communication device can transmit the payment information using the wireless communication interface 422, over a network, to the payment clearinghouse. After a payment confirmation is received from the payment clearinghouse, a record of the entire transaction including any product information, customer information, and payment information is completed and sent to an in-store server using the wireless communication interface 422.

In some embodiments, the roaming point-of-sale system utilizes a handheld computing device that is generally not manufactured specifically for use in connection with in the roaming point-of-sale system. Rather, the handheld computing device can be a more general-purpose device with a sales application installed on it to allow the device to be used with the scanner that is specially designed for use in connection with in the roaming point-of-sale system. The handheld computing device suitably will have many other functions, e.g., as a mobile phone, as a portable media-playing device, as an email client, as a game-playing device, as a personal organizer, etc. However, because the handheld-computing device is not a specific-purpose device, the scanner and handheld-computing device must be configured to electronically communicate with each other.

Figure 5:
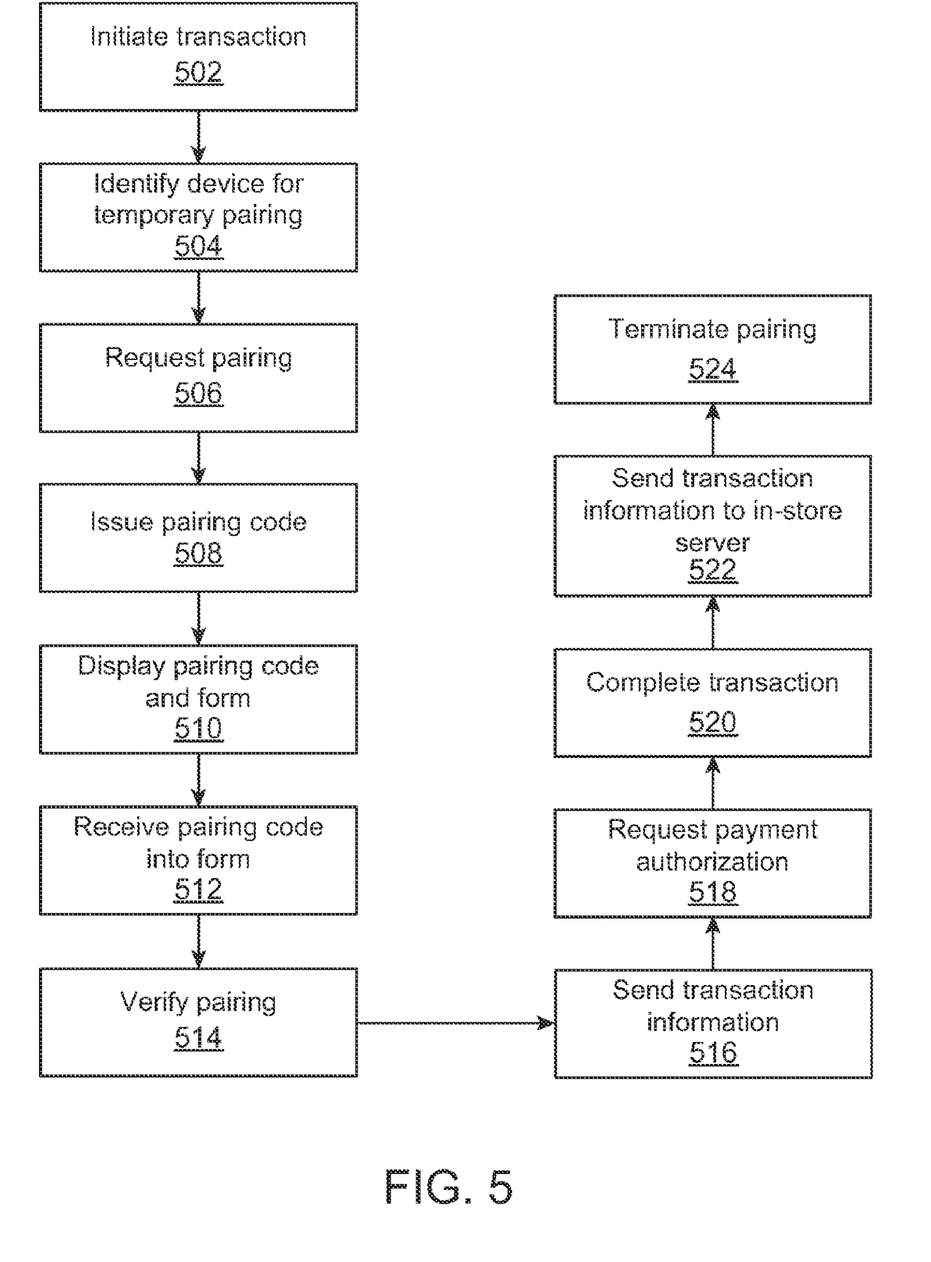
FIG. 5 illustrate an exemplary method embodiment.

FIG. 5 illustrates a flow chart of an exemplary method for temporarily pairing a roaming point-of-sale system selected from a pool of such devices with a payment terminal selected from a pool of such devices.

A transaction can be initiated by a roaming point-of-sale system (502). The roaming point-of-sale system can be any such system selected from a group of such systems. In some embodiments, such as the retail store embodiments discussed herein, the roaming point-of-sale system, associated with any of the store clerks, can scan one or more barcodes encoding one or more product identification codes, respectively, or otherwise input the product identification code(s). In some embodiments, the roaming point-of-sale system can communicate using a wireless network with an in-store server to correlate the product identification codes with other associated product information including at least pricing information. Alternatively, the roaming point-of-sale system can have the associated product information stored on board the system.

At 504, a device can be identified for temporary pairing with the roaming point-of-sale system. In the retail store embodiments, a device for pairing can be any payment terminal in the store. In most cases, the retail store will have more than one payment terminal. The device is identified, as in 504, by identifying the payment terminal with the roaming point-of-sale system by way of entering data representative of the payment terminal into the roaming point-of-sale system. In some embodiments, this can be done by scanning a barcode printed on the payment terminal. The barcode can encode data that uniquely identifies the payment terminal. In some embodiments, a sales associate can input data that uniquely identifies the payment terminal. Some examples of data that can uniquely identify the payment terminal include a numerical value, a network address, e.g. IP address, a name, etc.

At 506, the roaming point-of-sale system can send a pairing request to an in-store server, which can broker a pairing between the roaming point-of-sale system and the payment terminal. The pairing request can include data identifying the roaming point-of-sale system and the payment terminal.

In some embodiments, if the payment device is identified by a network address, the roaming point-of-sale system can request pairing directly with the payment terminal. While in some embodiments, the roaming point-of-sale system can request a network address for an identified payment terminal from a server that can associate data identifying the payment terminal with a network address of the payment terminal. In such embodiments, the roaming point-of-sale system can request pairing directly from the payment terminal using the returned network address. In some embodiments, the roaming point-of-sale system can directly request pairing with the payment terminal using a message broadcast across an in-store network, wherein the payment terminal can recognize that the request is meant for it. As can be understood, many methods of making a request for pairing are suitable for use with the present technology.

Further, in some embodiments, the payment terminal can request pairing with the roaming point-of-sale system using the inverse of the methods described above.

Returning to the embodiments wherein the roaming point-of-sale system requests pairing with an identified payment terminal through a server, the server can broker a temporary pairing of the devices. At 508, the server can issue a pairing code to both the roaming point-of-sale system and the payment terminal. The pairing code can be generated by the server and can be a randomly generated number or assigned according to a scheme.

Upon receiving the pairing codes at the roaming point-of-sale system and the payment terminal, one device can display the pairing code to the sales associate and the other can present a form for accepting entry of the pairing code (510). Which device takes which role is not important to the present technology, but it should be consistent within any system. However, in some countries, depending on their regulations or certifications for payment terminals, the payment terminals might be forbidden from displaying a form to receive entry of the pairing code. Such regulations are known, for example, in France. Therefore, when using this system in France, the payment terminal should display the pairing code and the roaming point-of-sale system should be configured to receive the pairing code. Though, in countries that do not have such regulations, it can be more preferable to display the pairing code on the roaming point-of-sale system because the sales associate is already interacting with that interface, and the roaming point-of-sale system is under the control of the sales associate.

The pairing code can be input into the form presented for that purpose (512). The device presenting the form can verify that the proper code has been entered and verify to the server that the proper devices have been associated for the purpose of completing the transaction (514). Alternatively the in-store server can verify that the pairing code is proper and verify the pairing.

If however, the wrong pairing code is entered, the process can terminate.

With the pairing completed, the roaming point-of-sale system and the payment terminal can communicate with each other, either directly, or through the server as an intermediary. The roaming point-of-sale system can send transaction information, which can include at least a total payment amount to the payment terminal (516). In some embodiments, payment card information can also be entered into the roaming point-of-sale system using a magnetic strip reader or by receiving the information through another input device such as a touch-screen or keypad. If the payment card information is entered into the roaming point-of-sale system, this information is also sent to the payment terminal.

However, in some embodiments, the payment card information can be entered directly into the payment terminal using a magnetic strip reader or other input mechanism commonly associated with such devices.

If the payment mechanism, e.g. a debit card as opposed to a credit card, requires a PIN entry, the payment terminal can accept entry of the PIN in accordance with applicable regulations. At 518, the payment terminal can request payment authorization from a clearinghouse as is conventionally known with respect to payment terminals. Upon receiving confirmation that the transaction is authorized, the transaction can be completed (520) by reporting the necessary information to the in-store server (522) and providing the customer with a receipt.

The in-store server can be provided with information regarding payment method and related data and also information regarding the products sold, the sales associate conducting the transaction and other information collected in association with a sale (522). In some embodiments the information being reported to the in-store server can be reported from both devices according to their knowledge of the transaction. In other words, the payment terminal can report payment information and the roaming point-of-sale system can report information regarding the sale. In some embodiments, the payment terminal can report payment information to the roaming point-of-sale system, which can report all the information to the server and can also use the information to generate a receipt for the customer.

After the transaction has been completed and the necessary information has been reported to the in-store server, the pairing of the roaming point-of-sale system and payment terminal can be terminated (524) so that both devices can be used in another transaction.

Figure 6:
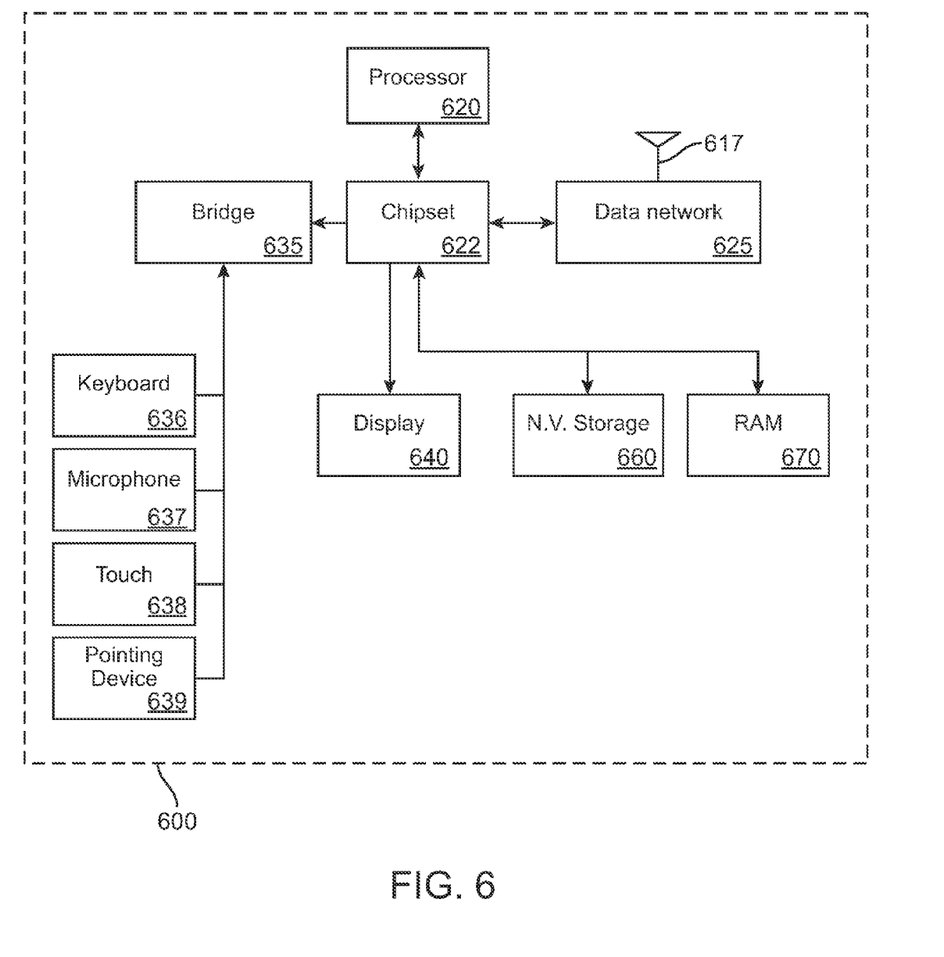
FIG. 6 illustrates a computer system for executing the systems and methods described herein.

FIG. 6 illustrates a computer system 600 for executing the exemplary systems and methods described herein. Computer system 600 is an example of computer hardware, software, and firmware that can be used to implement present disclosure. System 600 includes a processor 620, representative of any number of physically and/or logically distinct resources capable of executing software, firmware, and hardware configured to perform identified computations. Processor 620 communicates with a chipset 622 that can control input to and output from processor 620. In this example, chipset 622 outputs information to display 640, and can read and write information to non-volatile storage 660, which can include magnetic media, and solid state media, for example. Chipset 622 also can read data from and write data to RAM 670. A bridge 635 for interfacing with a variety of user interface components can be provided for interfacing with chipset 622. Such user interface components can include a keyboard 636, a microphone 637, touch detection and processing circuitry 638, a pointing device, such as a mouse 639, and so on. In general, inputs to system 600 can come from any of a variety of sources, machine generated and/or human generated.

Chipset 622 also can interface with one or more data network interfaces 625 that can have different physical interfaces 617. Such data network interfaces can include interfaces for wired and wireless local area networks, for broadband wireless networks, as well as personal area networks. Some applications of the methods for generating and displaying and using the GUI disclosed herein can include receiving ordered datasets over physical interface 617 or be generated by the machine itself by processor 620 analyzing data stored in memory 660 or 670. Further, the machine can receive inputs from a user via devices 636, 637, 638, 639 and execute appropriate functions, such as browsing functions by interpreting these inputs using processor 620.

Methods according to the above-described examples can be implemented using computer-executable instructions that are stored or otherwise available from computer readable media. Such instructions comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method comprising:
receiving a request to temporarily pair a roaming point-of-sale system and a payment terminal, the request to pair identifying the specific roaming point-of-sale system and specific payment terminal on a network;
sending a pairing code to the roaming point-of-sale system for display;
receiving a verification that the pairing code that was sent to the roaming point-of-sale system was entered into the payment terminal; and
creating an association between the roaming point-of-sale system and the payment terminal.

2. The method of claim 1, wherein the roaming point-of-sale system is one of plurality of roaming point-of-sale systems and the payment terminal is one of a plurality of payment terminals.

3. The method of claim 2, further comprising:
disassociating the roaming point-of-sale system from the payment terminal after a transaction has been completed.

4. The method of claim 2, wherein the pairing code is a randomly generated code.

5. A product comprising:
a machine-readable medium; and
machine-executable instructions for causing a computer to perform the method comprising
receiving data, by a roaming point-of-sale system, identifying a selected payment terminal chosen from a plurality of payment terminals;
sending a request to pair with the selected payment terminal, the request including data identifying the selected payment terminal;
receiving a communication verifying that the roaming point-of-sale system is paired with the payment terminal;
sending purchase price data associated with a product to the payment terminal;
concluding a sale of the product; and
terminating the paired relationship between the roaming point-of-sale system and the payment terminal.

6. The product of claim 5, wherein the receiving data identifying a selected payment terminal is data received by decoding a barcode associated with the payment terminal.

7. The product of claim 5, wherein the method further comprises:
receiving a pairing code; and
displaying the pairing code on a display, whereby a user can read the pairing code and enter it into the selected payment terminal to confirm that the payment terminal is properly identified before receiving the confirmation verifying the pairing.

8. The product of claim 5, wherein the concluding a sale includes receiving payment confirmation data.

9. The product of claim 5, wherein the concluding a sale includes sending the product data and payment confirmation data to an in-store server.

10. A system comprising:
a plurality of roaming point-of-sale systems, each configured to pair with any one of a plurality of payment terminals;
the plurality of payment terminals, each configured to pair with any one of the plurality of handheld computing devices;
an in-store server including a processor; and
a computer readable medium having computer executable instructions stored thereon for causing the processor of the in-store server to perform a method comprising:
associating one of the plurality of roaming point-of-sale systems with one of the plurality of payment terminals;
routing communications between the associated roaming point-of-sale system and the associated payment terminal to facilitate a sales transaction; and
terminating the association between the roaming point-of-sale system and the payment terminal upon completion of the sales transaction.

11. The system as recited in claim 10, wherein each of the plurality of roaming point-of-sale systems includes a barcode scanner, and each of the plurality of roaming point-of-sale systems are configured to scan product identifying information using the barcode scanner.

12. The system as recited in claim 10, wherein the associating one of the plurality of roaming point-of-sale systems with one of the plurality of payment terminals includes receiving data identifying a payment terminal.

13. The system as recited in claim 10, wherein the associating one of the plurality of roaming point-of-sale systems with one of the plurality of payment terminals includes issuing a pairing code to the one of the plurality of roaming point-of-sale systems.

14. The system as recited in claim 10, wherein the plurality of payment terminals are configured to accept instructions from the server to display a form to receive a pairing code, and is further configured to accept the pairing code.

15. The system as recited in claim 14, wherein the server receives confirmation that the pairing code has been properly entered into one of the plurality of payment terminals, and as directed by the computer executable instructions stored on the server, performing the associating.

16. A method of completing a retail sales transaction comprising:
scanning a barcode on a product package to identify product information using a roaming point-of-sale system, wherein the roaming point-of-sale system is one of a plurality of such systems on a network;
receiving data identifying a payment terminal, wherein the payment terminal is one of a plurality of such terminals on the network;
pairing the roaming point-of-sale system with the payment terminal as a result of a pairing code being entered into the payment terminal, the pair code first having been received at the roaming point-of-sale system and displayed thereon;
sending the product information to the payment terminal;
receiving a payment processed message from the payment terminal which signals that the sales transaction is complete; and
unpairing the roaming point-of-sale system from the payment terminal.

17. The method of claim 16, further comprising:
sending a record of the sales transaction to an in-store server.

18. The method of claim 16, wherein a record of the pairing is recorded by an in-store server.

19. The method of claim 16, wherein an in-store server facilitates the pairing by transmitting the pairing code.

* * * * *